United States Patent
Charpentier et al.

(10) Patent No.: US 10,663,176 B2
(45) Date of Patent: *May 26, 2020

(54) GLASS-CERAMIC WORKTOP

(71) Applicant: EUROKERA S.N.C., Chateau-Thierry (FR)

(72) Inventors: Bertrand Charpentier, Chateau-Thierry (FR); Javier Fernandez, Boadille Del Monte (ES); Michel Lismonde, Brasles (FR); Michael Ravel, Barzy sur Marne (FR); Nicolas Roux, Chateau-Thierry (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 702 days.

This patent is subject to a terminal disclaimer.

(21) Appl. No.: 15/124,443

(22) PCT Filed: Mar. 9, 2015

(86) PCT No.: PCT/FR2015/050581
§ 371 (c)(1),
(2) Date: Sep. 8, 2016

(87) PCT Pub. No.: WO2015/136205
PCT Pub. Date: Sep. 17, 2015

(65) Prior Publication Data
US 2017/0016628 A1    Jan. 19, 2017

(30) Foreign Application Priority Data

Mar. 10, 2014 (FR) ..................... 14 51947

(51) Int. Cl.
*F24C 15/10* (2006.01)
*F24C 7/08* (2006.01)
(Continued)

(52) U.S. Cl.
CPC ............ *F24C 15/10* (2013.01); *A47B 13/086* (2013.01); *A47B 13/12* (2013.01); *A47B 33/00* (2013.01);
(Continued)

(58) Field of Classification Search
CPC ....... A47B 13/086; A47B 13/12; A47B 33/00; C03B 32/02; C03C 17/007;
(Continued)

(56) References Cited

U.S. PATENT DOCUMENTS 3,775,161 A * 11/1973 Martyny ................. C03C 17/22
428/336
4,837,093 A * 6/1989 Coulon .................... B05B 7/025
428/426
(Continued)

FOREIGN PATENT DOCUMENTS

CN    1590330 A  *  3/2005 ............. C03B 5/193
FR    2 766 816 A1    2/1999
(Continued)

OTHER PUBLICATIONS

Schott, Mar. 1989, XP 055279700, pp. 1-2 (Year: 1989).*
(Continued)

*Primary Examiner* — Jimmy Chou
(74) *Attorney, Agent, or Firm* — Element IP, PLC

(57) ABSTRACT

An item of furniture or appliance includes at least one worktop formed from at least one substrate made of a transparent monolithic glazing material and of area larger than 0.7 m², equipped with a coating so that the substrate equipped with the coating has a haze higher than 15%, a light transmission $T_L$ lower than 60% and an opacity indicator higher than 85. The item of furniture or appliance also includes at least one heating element, at least one light source to light up one or more zones or one or more elements
(Continued)

or displays of the substrate, the source being located plumb with the substrate in order to form a display by projection, or under the substrate in order to form a display by transmission through the substrate, and at least one interface for communicating with at least one element of the worktop.

17 Claims, 1 Drawing Sheet

(51) Int. Cl.
    *C03C 17/00* (2006.01)
    *A47B 13/08* (2006.01)
    *A47B 13/12* (2006.01)
    *A47B 33/00* (2006.01)
    *C03B 32/02* (2006.01)
    *C03C 3/00* (2006.01)
    *C03C 10/00* (2006.01)
    *F24C 3/12* (2006.01)
    *G05B 15/02* (2006.01)
    *H05B 6/12* (2006.01)

(52) U.S. Cl.
    CPC .............. *C03B 32/02* (2013.01); *C03C 3/00* (2013.01); *C03C 10/00* (2013.01); *C03C 17/007* (2013.01); *F24C 3/126* (2013.01); *F24C 7/083* (2013.01); *F24C 15/102* (2013.01); *G05B 15/02* (2013.01); *H05B 6/1218* (2013.01); *C03C 2217/445* (2013.01); *C03C 2217/475* (2013.01); *C03C 2217/485* (2013.01); *C03C 2217/72* (2013.01); *G05B 2219/2613* (2013.01)

(58) Field of Classification Search
    CPC ........ C03C 2217/445; C03C 2217/475; C03C 2217/485; C03C 2217/72; F24C 3/126; F24C 7/083; F24C 15/102; G05B 15/02; G05B 2219/2613; H05B 6/1218
    USPC .......................................................... 219/209
    See application file for complete search history.

(56) References Cited

U.S. PATENT DOCUMENTS

| | | | | |
|---|---|---|---|---|
| 4,990,750 | A * | 2/1991 | Martel | F24C 15/105 219/445.1 |
| 5,357,079 | A * | 10/1994 | Henry | F24C 7/083 126/211 |
| 5,700,579 | A * | 12/1997 | Jeanvoine | B32B 17/10036 428/437 |
| 5,976,678 | A * | 11/1999 | Kawazu | B32B 17/10339 427/165 |
| 6,020,553 | A * | 2/2000 | Yogev | F24S 23/00 136/246 |
| 6,506,700 | B1 * | 1/2003 | Combes | C03C 3/087 501/70 |
| 6,528,440 | B1 | 3/2003 | Vilato et al. | |
| 6,787,211 | B2 * | 9/2004 | Kishima | B82Y 10/00 428/64.1 |
| 7,749,603 | B2 * | 7/2010 | Graham | H05K 9/0067 427/331 |
| 8,664,131 | B2 * | 3/2014 | Beall | C03C 14/00 501/7 |
| 9,927,130 | B2 * | 3/2018 | Ortmann | F24C 15/10 |
| 10,048,408 | B2 * | 8/2018 | Lu | C03C 17/322 |
| 10,427,976 | B2 * | 10/2019 | Barkai | C03C 17/3417 |
| 10,546,846 | B2 * | 1/2020 | Lowes | F21V 3/12 |
| 2003/0141295 | A1 * | 7/2003 | Ishikawa | H05B 6/688 219/697 |
| 2005/0143246 | A1 | 6/2005 | Comte et al. | |
| 2007/0221655 | A1 * | 9/2007 | Bridgwater | A47J 37/0871 219/494 |
| 2007/0232476 | A1 * | 10/2007 | Siebers | C03C 3/095 501/4 |
| 2007/0295711 | A1 * | 12/2007 | Striegler | C03C 8/18 219/448.11 |
| 2011/0114620 | A1 * | 5/2011 | Lommel | F24C 7/082 219/209 |
| 2011/0226231 | A1 * | 9/2011 | Siebers | C03C 3/087 126/211 |
| 2011/0272396 | A1 * | 11/2011 | Bunuel Magdalena | C04B 41/52 219/622 |
| 2012/0263957 | A1 * | 10/2012 | Chopinet | C03C 3/089 428/428 |
| 2013/0098903 | A1 | 4/2013 | Di Giovanni et al. | |
| 2013/0274085 | A1 | 10/2013 | Beall et al. | |
| 2013/0286630 | A1 * | 10/2013 | Guiset | F24C 7/083 362/23.1 |
| 2013/0296155 | A1 | 11/2013 | Beall et al. | |
| 2014/0057092 | A1 | 2/2014 | Beall et al. | |
| 2014/0061186 | A1 | 3/2014 | Laurent et al. | |

FOREIGN PATENT DOCUMENTS

| | | | |
|---|---|---|---|
| FR | 2 864 071 A1 | 6/2005 | |
| WO | 2012/001300 A1 | 1/2012 | |
| WO | 2012/146860 A1 | 11/2012 | |
| WO | WO-2015138901 A1 * | 9/2015 | ............... C09D 1/00 |

OTHER PUBLICATIONS

International Search Report dated Jun. 17, 2015 in PCT/FR2015/050581 filed Mar. 9, 2015.
"Whirlpool Interactive Cooktop at CES 2014", https://www.youtube.com/watch?v=6frHH5OtXU4, XP002734990, Jan. 9, 2014, 3 pages.

* cited by examiner

GLASS-CERAMIC WORKTOP

The present invention relates to a worktop, worktable, counter or unit formed from at least one large plate positioned or intended to be positioned horizontally on one or more supporting elements (carcass of a unit, supporting leg(s)) in order to provide a stable surface intended for various uses. In particular, the present invention relates to a table or a unit having a surface or top able to allow, simultaneously or in succession, various activities to be carried out and/or objects to be supported, and in particular allowing food to be heated or cooked in appropriate recipients and other uses to be made thereof.

The materials conventionally used to produce worktops are for example wood, quartz stone, Cohan®, etc. Moreover in kitchens, in particular professional kitchens, it is known to use large typically metal and/or composite plate cooktops to cook food. In particular, multilayer plates based on ceramic layers or components, made of ceramics such as stoneware, metal layers or components, made of metals such as aluminum, and layers or components made of insulating plastics such as Bakelite, are known, these plates generally having a substantial thickness (of about 12 mm for example) and being complex to produce.

Similarly, smaller cooktops made of glass-ceramic or toughened glass (in particular of area generally smaller than 0.4 m², plates of larger area possibly being more difficult to obtain using conventional processes, and possibly leading to problems with flatness, handling etc.) are known, in particular for domestic uses, the use of glass-ceramics in cooktops having become more widespread in the last few years, especially because of the performance obtained with this material in this application and the attractive appearance of the plates produced.

Various types of glass-ceramic plates are known at the present time, each variant being the result of extensive studies and numerous trials since it is very difficult to make changes to these plates and/or to the process used to obtain them without running the risk of adversely affecting the sought-after properties: in order to be able to be used as a cooktop, a glass-ceramic plate must generally have a transmission at wavelengths in the visible domain that is both low enough to allow, when they are turned off, the underlying heating elements to be at least partially masked, and high enough that, depending on the circumstances (radiant heating, inductive heating, etc.), the user is able, for safety reasons, to visually detect the heating elements when they are turned on; such a plate must also have a high transmission at wavelengths in the infrared domain, especially in the case where the plate is to be associated with radiant elements. The plates thus designed are intended to be used exclusively as cooktops and are conventionally neither intended to receive objects other than the heat-resistant utensils used in the cooking of food, nor intended to be used for activities other than the cooking of food.

The aim of the present invention is to widen the existing range of household and professional appliances by providing a new type of interactive product that has a wider variety of uses.

This aim is achieved by the novel and advantageously interactive article, fitting, item of furniture or appliance according to the invention, this item of furniture/appliance comprising:

- at least one worktop (or counter or worktable) formed from at least one substrate (in particular a plate or surface or top) made of (or of (based on) a or essentially consisting of a) transparent, monolithic (or integrally formed or unitary) glazing material (in particular having a light transmission higher than 60%), said substrate advantageously being essentially flat and of area (length by a width of its largest face) larger than 0.7 m², equipped with a coating so that the substrate equipped with the coating has a haze higher than 15%, a light transmission $T_L$ lower than 60% and an opacity indicator higher than 85;
- at least one heating element (in particular under the substrate and hidden by the latter when this heating element is not in operation/is turned off);
- at least one light source, in particular intended to light up (make visible) one or more zones (such as heated zones) or one or more elements or displays (for example an indicator of an operational state or a power indicator) of the substrate, this source in particular being located plumb with the substrate in order to form a display by projection, or under the substrate in order to form a display by transmission through the substrate; and
- at least one interface for communicating with at least one element of the worktop (for example with the one or more light sources and/or the one or more heating elements), and/or if needs be wirelessly with at least one external element (exterior to the worktop), for example with an external module (an external system, an external device).

The product according to the invention meets the stated aim, the present invention thus providing a novel interactive item of furniture and/or appliance (especially allowing functions such as a cooking function to be activated and zones or data to be displayed) that is suitable for use both in a kitchen and in other habitable rooms, the worktop possibly forming part of an optionally unapertured unit, a table, a counter, etc., this worktop being mounted or being able to be mounted horizontally on (in particular on top of) one or more supporting elements (carcass of a unit, supporting leg(s)) in order to provide a stable surface intended for various uses, the worktop, item of furniture or appliance according to the invention having a continuous top surface that allows, simultaneously or in succession, objects (such as pieces of paper, computers, vases, tableware, etc.) to be held, activities (such as work, games, reading, etc.) to be carried out and food to be prepared cooked or heated in appropriate containers.

More generally, the invention also relates to a worktop formed from at least one substrate made of a transparent monolithic glazing material and of area larger than 0.7 m², equipped with a coating so that the substrate equipped with the coating has a haze higher than 15%, a light transmission $T_L$ lower than 60% and an opacity indicator higher than 85, this worktop being intended to form part of a multiuse interactive item of furniture or appliance (intended for a number of uses such as listed in the preceding paragraph), in particular such as defined above according to the invention.

The invention also relates to the use of a substrate, and in particular of a plate, made of a monolithic transparent glazing material and of area larger than 0.7 m², equipped with a coating so that the substrate equipped with the coating has a haze higher than 15%, a light transmission $T_L$ lower than 60% and an opacity indicator higher than 85; as a multiuse interactive worktop, in particular such as mentioned in the above paragraphs.

As indicated above, the worktop is formed from a large substrate or plate made of a monolithic glazing material (the glazing material forming a single object/being a single part, even though the substrate may if needs be contain voids, generally produced in the part after it has been formed, for esthetic or functional reasons) the advantage of such a large monolithic plate especially being that it provides a mostly continuous/uniform/joint-free surface that is attractive, easy to clean, more ergonomic and safer (as it is made of an impermeable material, in case of the spillage of liquids, etc.), etc. The substrate essentially or only consists of the glazing material, this substrate/glazing material possibly if needs be being equipped with thin decorative or functional coatings (especially of the order of a few tens of nanometers to a few hundred microns or more in thickness), for example made of an enamel, paint, thin films, etc. as specified below.

Contrary to common practice in the field of glass-ceramics in particular, this (substrate made of a) glazing material is large in size, its area (corresponding to the product of its length by its width for its largest face—generally its upper face, which is intended to be visible and to hold (household, cooking-related and/or work-related) articles being larger than 0.7 m$^2$, preferably larger than 0.9 m$^2$, especially larger than 1 m$^2$ and in particular larger than or equal to 2 m$^2$. However, in the case of glass-ceramics in particular, the manufacture of large plates leads to many problems with flatness and handling. In the present invention, a large plate that nonetheless has a good flatness may nevertheless advantageously be obtained by decreasing run speed (or increasing the length of the ceramitization furnace or increasing dwell time in the furnace) relative to the (standard) speed (or length of the furnace or time) conventionally used to obtain glass-ceramic plates of conventional size smaller than 0.4 m$^2$, as explained below with regard to the process according to the invention.

The substrate/glazing material according to the invention is advantageously flat (or mostly or almost flat) and in particular has a flatness (height between the highest point and the lowest point of the substrate relative to the mean plane of the substrate, excluding any deformations intentionally produced in the substrate for esthetic or functional purposes) lower than 0.1% of the diagonal of the substrate, and preferably lower than 3 mm, especially lower than 2 mm and in particular lower than 1 mm or even of about zero, depending on the size/area/diagonal of the substrate, the flatness being measured using a SurFlat ondulometer sold by Visual. The substrate is generally of geometric shape and in particular rectangular or even square, circular or oval, etc., and generally has an "upper" face (face that is visible) in the use position and a "lower" face (generally hidden, in the body or carcass of the unit incorporating the worktop) in the use position, and an edge face (or edge or thickness). The upper face is generally flat and smooth but may also contain at least one protruding zone and/or at least one recessed zone and/or at least one aperture and/or have beveled edges (these features being added during manufacture of the substrate, for example by rolling, gravity bending or pressing, etc., or being added during reworking of the substrate), etc., these variations in shape advantageously forming continuous variations in the plate (i.e. they do not involve other materials or joints). The lower face may especially be smooth or equipped with studs increasing its mechanical strength and obtained for example by rolling.

The thickness of the monolithic substrate made of the monolithic glazing material that is used is generally at least 2 mm, especially at least 2.5 mm, and in particular about 3 to 30 mm, said thickness advantageously being smaller than 15 mm, in particular about 3 to 15 mm and especially from 3 to 10 mm.

The glazing material of the substrate used is advantageously resistant to high temperatures and/or has an expansion coefficient of zero or almost zero (for example of lower than $15 \times 10^{-7}$ K$^{-1}$) and in particular is advantageously a glass-ceramic or toughened (especially chemically or thermally tempered) glass. Preferably, the substrate is a substrate made of glass-ceramic. As defined according to the invention, the glazing material is advantageously transparent and in particular has a light transmission $T_L$ such as defined according to the invention higher than 60% and especially higher than 80%.

The glass-ceramic used may especially have a composition such as described in the patent applications published under the following numbers: WO2013171288, US2010167903, WO2008065166, EP2086895, JP2010510951, EP2086896, WO2008065167, US2010099546, JP2010510952, EP0437228, this glass-ceramic in particular being a lithium aluminosilicate glass-ceramic.

The glass-ceramic may be arsenic-fined (i.e. be (made from a mother glass)) of composition comprising about 0.2% to 1.5% by weight arsenic oxide (expressed as As$_2$O$_3$), or may not be arsenic-fined (in particular having an arsenic oxide content of 0.2% and in particular lower than 0.1% or even zero)/be tin-fined.

The glazing material may also be a non-ceramitized tempered glass, for example a bulk-colored tempered lithium aluminosilicate glass such as described in the patent applications published under the following numbers: FR1060677 and WO2012080672, or even a tempered glass of another type (soda-lime, borosilicate, etc.) for example such as described in the patent application published under number WO2012146860.

The glass-ceramic or the tempered glass are obtained by respective s processes described in the aforementioned documents using treatment temperatures and cycles allowing the glazing material having the selected properties given in the definition of the invention to be obtained. In the case of glass-ceramics, these processes are preferably modified by decreasing run speed by at least 25% and preferably by at least 50%, or by increasing the length of the ceramitization furnace or the dwell time in said furnace by at least 25% and preferably at least 50%, relative to the speeds, lengths and times, respectively, normally used to obtain a large flat substrate such as required according to the invention, as explained below.

The transparent glass-ceramic substrate generally comprises crystals of β-quartz structure within a residual vitreous phase, the absolute value of its expansion coefficient advantageously being lower than or equal to $15 \times 10^{-7}$/° C., or even to $5 \times 10^{-7}$/° C., this glass-ceramic for example being that of the plates sold under the name KeraLite by EuroKera.

The glazing material may if needs be also comprise colorants giving particular hues to the substrate, for example vanadium oxide, iron oxide, cobalt oxide, cerium oxide, selenium oxide, chromium oxide, or even nickel oxide, copper oxide and/or manganese oxide, etc.

As indicated in the definition of the invention, the substrate/glazing material is provided with a coating in order for the assembly to have the properties defined in the invention, this coating especially serving as a masking means intended to mask at least some of the subjacent elements (the heating means in particular), and if needs be allowing an opacity/low transmission and/or a haze favorable to the formation of a display by transmission of light through the substrate, or to the formation of a display by projection of light onto the surface of the substrate, which then forms a screen, to be obtained, as will be explained below.

The coating advantageously takes the form of at least one coat of paint or layer of thin films on at least some or most or even all of the lower face of the glazing material, in particular a coat of paint of about 5 to 500 μm in thickness and especially 5 to 50 μm in thickness. The paint used is preferably able to withstand temperatures higher than 350° C. (and generally comprised between 350° C. and 500° C.) and is for example based on silicone resin(s) and in particular silicone alkyd resin(s) (i.e. silicone resin(s) modified by the incorporation of alkyd resin(s)) or may even be based on other resins, such as epoxy or polyurethane resins, if intended for use at low temperatures below 200° C., this paint possibly, if needs be, comprising pigments and preferably enamel pigments (in proportions not exceeding 50% by weight) depending on the desired color. Alternatively, this coating may also take the form of at least one enamel layer on the upper face of the glazing material. The substrate thus coated may for example be of the same type as the plates sold under the name KeraResin by EuroKera.

As defined according to the invention, the coated substrate forming the worktop is selected so as to have a haze higher than 15% and in particular higher than 40% or even higher than 60%, a light transmission $T_L$ lower than 60% and in particular lower than 50% or even lower than 30% (this light transmission especially being nonzero/higher than 0) and an opacity indicator higher than 85 and preferably higher than 90 (and in particular lower than 100). The substrate has these properties over most (in particular over at least 80% or even over 100%) of its area, excluding any possible additional localized decorations (for example made of an enamel) or localized components applied to its surface.

Haze measures the extent to which light is scattered and is defined, in the context of the invention, as being the ratio of diffuse transmission to the total transmission at a wavelength equal to 550 nm, this haze being evaluated for example using the spectrophotometer equipped with an integrating sphere used for the light transmission measurements.

The light transmission $T_L$ is measured according to standard ISO 9050:2003 under illuminant D65, and is the total transmission (integrated in the visible domain), taking into account both direct transmission and possible diffuse transmission, the measurement being carried out for example using a spectrophotometer equipped with an integrating sphere, the measurement at a given thickness then being converted if needs be to the reference thickness of 4 mm according to standard ISO 9050:2003.

The opacity indicator (or factor or coefficient) $\Omega$ is determined in the present invention by the formula $\Omega = 100 - \Delta E^*$ and is evaluated by measuring (color in reflection obtained using a Byk-Gardner Color Guide 45/0 colorimeter) the color variation $\Delta E^*$, corresponding to the difference between the color, measured in reflection on the upper face of the substrate, of the substrate placed on an opaque black background, and that of the substrate placed on an opaque white background ($\Delta E^* = ((L_N^* - L_B^*)^2 + (a_N^* - a_B^*)^2 + (b_N^* - b_B^*)^2)^{1/2}$, according to the formula established by the CIE in 1976, $L_B^*$, $a_B^*$, $b_B^*$ being the color coordinates of the first measurement on the white background and $L_N^*$, $a_N^*$, $b_N^*$ being those of the second measurement on the black background in the CIE 1976 color space.

The coated substrate according to the invention allows, if needs be, a display to be formed by projection, as will be explained below, in particular in combination with light sources placed thereabove, and allows luminous zones to be displayed in order especially to signal the cooking zones when they are turned on, and/or allows if needs be a display to be formed by transmission of light using sources placed thereunder, this substrate masking at the same time elements (such as the heating elements and cables) placed underneath.

As defined above, the article according to the invention also comprises at least one heating element (or heater element), for example one or more radiant or halogen elements or one or more gas burners and/or one or more inductive heating means, these heating means generally being located under the worktop and hidden by the latter when turned off. The worktop of the article according to the invention may comprise one or more heating elements and likewise one or more rings. The term "ring" is understood to mean a cooking location. The article according to the invention may comprise a plurality of types of heating element or ring (gas ring, radiant ring, halogen element or inductive element). Preferably, the article according to the invention comprises by way of heating element(s) one or more inductive heating means.

The one or more heating means may be located in a defined zone (for example at one end of the substrate) or a plurality of zones of the substrate, or may be uniformly distributed under the substrate, for example occupying at least 25% of the area of the substrate, or may even occupy an area almost equivalent to that of the substrate (for example more than 50%, especially more than 75% or even more than 85%, or even 100% of the main area of the substrate), a plurality of small inductors for example lining the substrate under its lower face, in order to allow any zone to be heated as needs be.

The cooking locations on the worktop, plumb with the heating means, may be signaled (or not, in the case for example of a worktop equipped with heating means covering the entirety of its areal extent), on activation and/or permanently, especially by means, respectively, of one or more light sources and/or by means of a permanent decoration, for example made of an enamel. The patterns allowing the cooking zones to be signaled (and likewise any patterns signaling other zones or functions) may be relatively large in size, for example it may be a question of circles each of which encircles a heating element, or of small patterns (triangles, crosses, etc.) at the center or bottom thereof, etc.

Preferably, the cooking locations (and/or if needs be other zones and/or elements and/or functions and/or decorations) are signaled by at least one light source such as mentioned in the definition of the invention, this source once activated indicating for example the location using a luminous pattern (especially a disk, circle, cross, triangle, etc.) of fixed or variable color and/or size. Alternatively, is they may be indicated permanently, via a permanent pattern (especially a round circle, a cross, a triangle, etc.), especially obtained by depositing one or more layers (in particular such as those used to decorate glass-ceramics), for example made of enamel, on the surface of the plate (especially on the upper face).

In one preferred embodiment, and especially when the coated substrate is opaque or has a very low light transmission (especially lower than 5%), the one or more cooking locations (and/or if needs be other zones and/or elements and/or functions and/or decorations) are signaled by, and/or revealed using or by means of, at least one light source such as mentioned in the definition of the invention, on activation of said source, said source being located above (in the use position) or on the same side as the visible face of the substrate (i.e. on the side on which the display is to be formed or from which it is intended to be viewed) and allowing a luminous display to be formed by (direct) projection onto this surface/face, which then forms a screen. The substrate defined according to the invention is particularly well-suited to this type of display.

In another embodiment, for a coated substrate having a light transmission $T_L$ of at least 5%, the one or more cooking locations (and/or if needs be other zones and/or elements and/or functions and/or decorations) may (also or alternatively) be signaled by and/or revealed using or by means of at least one light source such as mentioned in the definition of the invention, on activation of said source, said source being placed under the substrate (in the use position) and being hidden thereby when turned off, said source allowing a luminous display to be formed via transmission through the worktop.

One or more light sources may also allow other elements or functions to be displayed, for example control zones or means (taking the form of touch controls, logos or even keyboards, etc.) or indicators (of currents/power, time, etc.) may be displayed, these for example being activatable via contact with the surface of the worktop (sensors located under the surface for example being used to detect this contact) or remotely (especially via wireless communication), or even by a simple movement of the hand (via sensors or detectors located if needs be on the exterior and sensing the movement, for example by triangulation, in order to convert it, especially using an algorithm and a suitable interface, into the activation of a function for example), or if needs be by placing a given object (saucepan, etc.) in a given location (such as a cooking zone) on the plate. The one or more light is sources may also allow decorations or various data (display for example of computer pages, culinary recipes, etc.) downloaded for example via a wireless link using an appropriate interface to be displayed, said data being projected or transmitted from the light sources onto the surface of the plate.

If needs be, the article according to the invention may comprise a plurality of light sources, for illuminating a plurality of zones or for displaying complex decorations or texts, or in order to increase the uniformity of the illumination, these sources possibly being placed along different axes and at different illumination angles in order to obtain the desired effect, without reflections or undesirable shadowing. In particular in the case of illumination via projection onto the worktop, which then acts as a screen, a plurality of sources are for example placed so that the angle between each source (or between each element, mirrors for example, transmitting the light toward the worktop) and the normal to the worktop is comprised between 5 and 60° and preferably between 30 and 45° in order to minimize the effects of shadows projected by a person using the worktop.

The one or more light sources may advantageously be formed by light-emitting diodes, especially for reasons of bulk, efficacy, lifetime and resistance to environmental conditions (heat, etc.), and/or may be other types of sources, for example halogen or incandescent lamps, lasers or liquid-crystal screens, the sources possibly, if needs be, being used in combination with lenses or mirrors, etc.

The diodes are advantageously semiconductor chips made of mineral materials (LEDs) especially emitting in one direction, and may be encapsulated, i.e. comprise a semiconductor component and a package (for example made of an epoxy or nylon resin) encapsulating the semiconductor component. These diodes may also be semiconductor chips without collimating lenses, for example of about one hundred pm or one mm in size, optionally with a minimal (for example protective) encapsulation.

The diodes may, if needs be, be borne by a carrier or strip or base, this base possibly having a (flat or inclined) surface that has been treated and/or made reflective for a better luminous efficacy, this surface for example being coated with a lacquer or coat of paint and/or a mirror coating, and/or coupled to a white or metal reflector in order to better direct the radiation emitted.

If needs be, it is also possible to use organic light-emitting diodes (OLEDs) especially consisting of a superposition of organic semiconductor layers between electrodes, and producing various colors to within one pixel following the path taken by the electricity through the organic layers.

Each source or the sources are joined (to the substrate or to a supporting member, for example to a part of the item of furniture and/or appliance or to an external part (associated with said item of furniture and/or appliance) such as a rail or a device suspended above the worktop (this device possibly also including other components such as a hood, the one or more sources possibly especially being integrated into this hood)), by soldering, clip fastening, adhesive bonding, etc., if needs be by way of another element; for example, it is possible to mount diodes, soldered to a carrier itself housed at the bottom of a metal profile, by clip fastening or adhesive bonding of the profile. The positions of the one or more sources (relative to the plate in particular) are adapted to allow a display to be formed on the substrate (by projection (especially from above) onto the plate (which then acts as a screen) or through the glass-ceramic when the substrate is not completely opaque).

The sources, and their power supplies and actuating mechanisms, may optionally be disassociated in order to allow desired zones of illumination to be illuminated simultaneously or individually depending on the need. Each source may be monochromatic (pure color) or polychromatic (mixed color).

The expression "monochromatic light source" is understood to mean a light source having a single emission peak in the visible wavelength range and such that the width of the peak varies from 1 to 100 nm and preferably from 5 to 50 nm.

The expression "polychromatic light source" is understood to mean a light source that has at least two emission peaks at different wavelengths in the visible wavelength range. The color perceived (by the retina) is then the result of mixing of the various wavelengths. It may be a question of an LED and/or an LED display having an emission spectrum containing a main emission peak and another emission peak that is wider than the main peak and generally of lower intensity, this peak for example being due to fluorescence. The polychromatic LED in particular emits a first emission (of high or low intensity) comprised between 400 and 500 nm and a second emission (of high or low intensity) in the visible beyond 500 nm (case for example of LEDs formed from at least one light-emitting crystal and of one or more photoluminescent phosphors). It is especially possible to use, by way of sources, white LEDs, LEDs that emit polychromatic light, formed for example from three monochromatic sources of independently adjusted intensities and of the "RGB" type (with three sources: a red source, a green source and a blue source), etc.

One or more sources may also be integrated into or coupled to or combined with one or more display-type structures ("7-segment" light-emitting diode or liquid-crystal displays for example) and/or touch-sensitive electronic control screens or panels with digital displays (if needs be over a wireless link via an interface), or integrated into another device such as an extractor hood as indicated above, etc.

Apart from the one or more sources, the article according to the invention may also comprise at least one waveguide intended to propagate light from one part of the article to another (in particular by total internal reflection or by reflection from metallic surfaces) if need be when the sources are placed under the worktop, each light source then being attached to the guide in question and interacting therewith by emitting its light into it so that the guide then transmits said light, the one or more light sources for example emitting into/being coupled to the edge face or edge of the guide. This guide is advantageously clear or transparent, and may be added (assembled after having been designed separately) for example under the lower face of the plate. It may be organic and/or plastic (for example made of polycarbonate or polymethyl methacrylate PMMA) or mineral (for example it may be made of glass). The article according to the invention may comprise a plurality s of guides each dedicated to one or more zones of illumination, or a unitary guide provided, if needs be, with apertures. The guide may be joined directly to the substrate or to another part of the item of furniture and/or appliance or to a supporting member, and may for example be securely fastened to the carcass on which the worktop rests. The guide allows, inter alia, the light to be better conveyed to the desired zones of illumination.

Especially in the case where one or more sources, associated if needs be with at least one waveguide, are placed under the worktop, the item of furniture and/or appliance may also comprise, in the illuminated zone, at least one means for extracting the radiation emitted by the one or more sources, for example one or more scattering elements or treatments, in particular a layer added to the surface and/or any treatment or differential texturing of the surface (either locally or to/of the entire surface) of the waveguide or the extraction surface, such as obtained by laser etching, printing an enamel, chemical (acid, etc.) etching or mechanical attack (sandblasting, etc.), etc. An extraction surface may, if needs be, be provided in the thickness of the guide, for example by applying a laser etching technology to its interior. The geometry and the roughness of the edge of a waveguide may also be modified in order to allow light to be locally and controllably extracted. The one or more extraction means allow the radiation to be extracted from the guide toward the zone that it is desired to illuminate. They may, if needs be, be combined with another treatment allowing the zones to be illuminated to be targeted, for example a screen-printed mask (masking certain zones and preventing the passage of light) deposited on part of one face of the substrate.

If needs be, the item of furniture and/or appliance may also comprise at least one filter (coupled (in operation) to at least one source, so as to form a colored luminous zone of a chosen color, this filter being generally positioned between the source and the plate and possibly especially being combined (or securely fastened) to the source and/or to another intermediate element and/or to the plate.

The term "filter" is understood to mean an optical filter (acting on the transmission of the light) and in particular a color filter (the action on the transmission of the wavelength being wavelength dependent), this filter in particular being a generally flat element or component especially taking the form of a film or layer or composite based on at least one organic or mineral material that is (semi)transparent (in the sense especially that it is transparent at (a) certain wavelength(s) in the visible and not transparent at/opaque at/affects one or more other(s)), in particular allowing certain wavelengths in the visible spectrum to be absorbed and/or reflected and/or reemitted. This filter may especially be an absorption filter (the action on the transmission of light occurring by absorption at certain wavelengths, the absorbed light possibly especially being converted into heat and/or emitted at other wavelengths), or a reflective filter (the action on the transmission of light occurring by reflection at certain wavelengths). The filter may be added (fabricated separately) and combined with at least one light source and/or another intermediate element or the worktop, or it may be integrated into or produced directly on said source and/or said element and/or said worktop, for example in the form of a printed layer, for example printed by inkjet printing. The radiation emitted by the source passes through the corrective filter in order to produce the required display on or through the substrate with which this assembly is combined. The filter may allow various colors, for example at least one colored zone of white color, or of a mixed color obtained by mixing a plurality of wavelengths, to be formed.

The item of furniture and/or appliance according to the invention, depending on the sources used (and, if need be, the filters used) and their locations may comprise one or more luminous/display zones having a functional and/or decorative purpose, said one or more zones possibly being in any zone of the plate (including heated zones), and it is possible to provide a plurality of luminous/display zones that are different (different color, brightness) and/or each zone may itself be various colors.

As indicated above, the item of furniture and/or appliance according to the invention also comprises at least one interface for communicating with at least one element of the worktop (such as the one or more light sources and/or the one or more heating elements) and/or, for example wirelessly, with an element external to the worktop.

This (especially machine-machine or human-machine) communication interface may be a device especially allowing the heating elements and/or light sources to be controlled or commands to be transmitted thereto from or via control knobs or touch controls integrated into the worktop or separate therefrom and located on an external element that is advantageously immovable or movable, in the case especially where the commands are communicated wirelessly.

Preferably, the interface enables wireless communication with a system external to the worktop (this system possibly forming part of the item of furniture and/or appliance according to the invention and possibly itself forming an interface), for example allowing heating zones and/or light sources to be activated and/or various functions (increase or decrease of power, cooking time, display of data on the worktop, etc.) to be controlled remotely, the commands given via the external system being transmitted via the interface to the relevant components of the item of furniture and/or appliance. The interface may also be a control interface located on the worktop (control panel) and that transmits the commands by wire or optionally wirelessly to other components of the worktop or to other components external to the worktop (for example to remote sources when the illumination is projected).

The external system in the case of remote control may for example take the form of a keyboard, a tablet or a touch screen or of a cellphone, this system possibly being fixedly mounted (for example fastened to a wall) or movable. This embodiment especially has the advantage of preventing finger marks on the worktop or cooking zones (which are unattractive and easily seen on glazing materials). Remote activation of the controls also makes it possible to decrease the risk of the operator being burnt as there is no need to interact with controls located in proximity to the cooking zones. Especially for the sake of safety, the wireless link may advantageously be of limited range (for example of range limited to the volume of the room in which the item of furniture and/or appliance is located) and/or be equipped with safety features in order to prevent inadvertent activation by a person outside of the room. The wireless communication in particular is achieved via electromagnetic or radioelectric waves, if needs be using systems of Bluetooth, WLAN, Wi-Fi, etc. type.

The interface may allow various signals initiated via contact or even via a movement to be transmitted in order to activate various components as mentioned above (for example it may convert a movement, detected by sensors by triangulation, these sensors being connected to this interface (and if needs be forming part thereof), into the activation of a function (for example the increase of the heating power, the illumination of the heated zones, etc.). It may also allow various data (such as Internet pages, wallpapers, culinary recipes, etc.) to be downloaded and/or transmitted, these data for example being transmitted to light sources in particular allowing them to be displayed on the surface of the worktop.

At least one interface is generally located on or under the worktop or in proximity thereto. The item of furniture and/or appliance according to the invention may also comprise a plurality of interfaces, of the same type or of different types, for example allowing various elements to be activated, or the item of furniture and/or appliance may comprise a plurality of interfaces that, if needs be, operate differently (are of different design, operate at different frequencies, etc.) for controlling a given element (for example a heated zone) with a higher level of safety. If needs be, provision may especially be made for an interface allowing the activation of the heated zones to be coordinated with the activation of the light sources. The interface may be formed by one or more sensors, connectors, control elements or any other electric, electronic or electromagnetic component, etc.

Preferably, the item of furniture and/or appliance according to the invention comprises at least one interface for communicating wirelessly with at least one external element for activating various zones and/or functions of the substrate, in particular when the light transmission $T_L$ of the substrate is low.

Apart from the interface, the item of furniture and/or appliance or worktop may be equipped with various cables, connectors or other, especially electrical, elements contributing to the transmission of commands from one part of the item of furniture and/or appliance to another.

The item of furniture and/or appliance and in particular the worktop according to the invention may also comprise various functional and/or decorative coatings, especially chosen from those generally used with the glazing materials in question, for example coatings based on enamel, paint, one or more thin (for example metal, dielectric, etc.) films, etc. For example, one of the faces of the substrate may comprise one or more enamel layers or one or more enamel patterns having a decorative role and/or that are used to signal one or more elements (displays, cooking zones, etc.) and/or that act as a coloring layer or a mask and/or that are used for other purposes (as light extractors or to increase the illumination uniformity, eta). In particular, the worktop may be equipped with a functional layer that provides it with one or more additional properties, for example an anti-scratch coating or a layer that increases its mechanical strength, etc.

The coating may for example be formed using processes such as screen printing, cathode sputtering, inkjet of enamel printing, etc., the coating possibly, depending on the type of coating and the desired function, especially being applied to the visible face or to the opposite face. For example, in the case of an enamel decoration, the latter is preferably deposited on the upper face especially for reasons of visibility, whereas an opacifying layer (such as the coating mentioned according to the invention) is preferably deposited on the opposite face, i.e. the face that is not intended to be visible, especially to better protect it from abrasion, etc.

As indicated above, the decorations (or at least some thereof) or displays of the worktop may also be obtained, with some advantage, via a luminous display (as opposed to by deposition of a coating), in particular by projecting light onto the worktop, which then forms a screen, as already mentioned above.

The present invention also relates to a process for manufacturing an item of furniture and/or appliance according to the invention and in particular the worktop of said item of furniture and/or appliance when said worktop is formed from at least one glass-ceramic substrate of area larger than 0.7 m$^2$, in which at least one cycle of ceramitization of a glass plate of area larger than 0.7 m$^2$ is carried out in order to obtain said substrate, and in which run speed is decreased by at least 25% and preferably by at least 50%, or the length of the ceramitization furnace or the dwell time in said furnace is increased by at least 25% and preferably at least 50%, relative to the optimal or conventional speed, length or dwell time, respectively, used to obtain a glass-ceramic substrate of area smaller than 0.4 m$^2$.

It will be recalled that glass-ceramic plates are generally manufactured as follows: glass of the composition selected for forming the glass-ceramic is melted in a melting furnace, then the molten glass is rolled into a standard ribbon or sheet by passing the molten glass between rollers, and the glass ribbon is cut to the desired size. The plates thus cut are then ceramitized in a way known per se, the ceramitization consisting in baking the plates with a temperature profile selected to convert the glass into the polycrystalline material referred to as "glass-ceramic", the expansion coefficient of which is zero or almost zero and which is able to withstand thermal shocks of as much as 700° C. The ceramitization generally comprises a step of gradually increasing temperature to the nucleation range, s generally lying near the glass transformation range; a step, lasting several minutes, in which temperature is increased through the nucleation range; a new progressive increase in the temperature up to the temperature of the ceramitization stage; holding the temperature of the ceramitization stage for several minutes; and then rapid cooling down to room temperature. If needs be, the process also comprises a cutting operation (generally before the ceramitization) for example with a water jet, or involving mechanical scoring with a cutter, etc. followed by a shaping operation (molding, beveling, etc.). The process may also comprise a step of rolling or gravity bending in order to form particular three-dimensional shapes.

In the present invention, the glass-ceramic follows a ceramitization cycle that gives it the desired properties, in particular a transparent appearance.

Other details and advantageous features will become more apparent below from the description of a nonlimiting embodiment of the invention, given with reference to the appended drawings in which.

Figure 1:
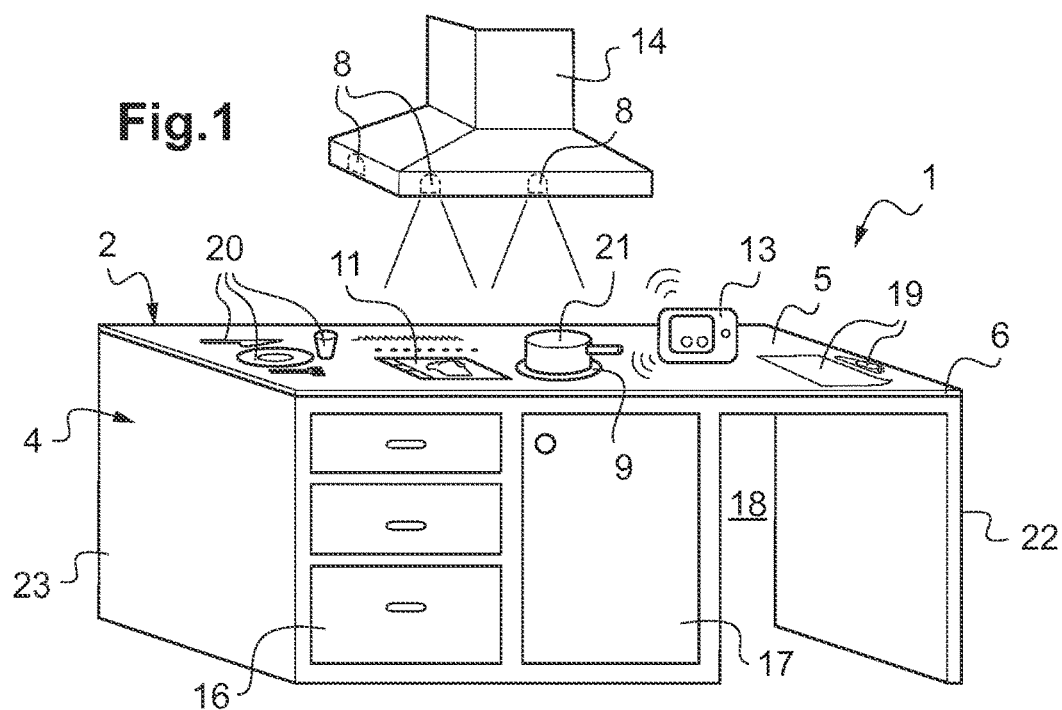
FIG. 1 shows a schematic perspective view of an item of furniture and/or appliance according to the invention.
Figure 2:
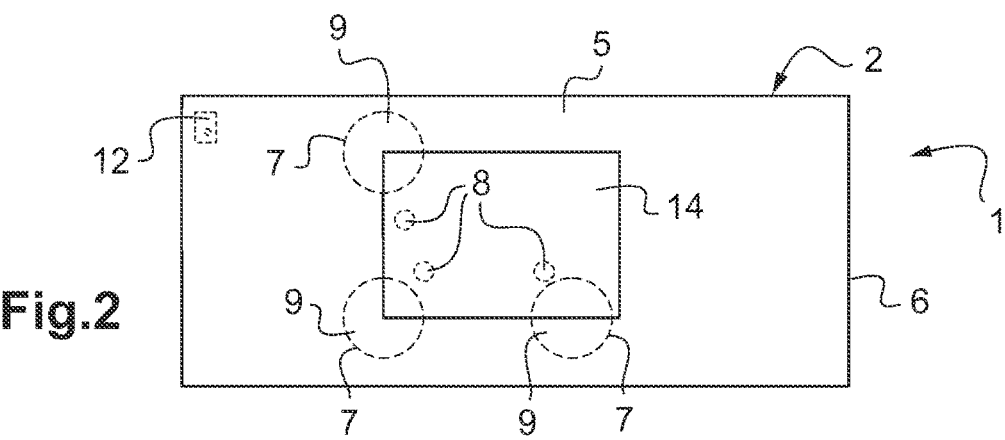
FIG. 2 shows a schematic top view of a similar item of furniture and/or appliance (the utensils on the surface and the underlying unit elements are not shown)

In this example the item of furniture and/or appliance (1) according to the invention comprises a unit (2) formed from a carcass (4) surmounted by a worktop (5) formed from at least one glass-ceramic substrate of 2 m² area, formed from a transparent (monolithic) glass-ceramic plate (6) (the glass-ceramic intrinsically having a light transmission $T_L$ of 88%), this glass-ceramic plate being equipped with a coating (10) made of paint of 42 μm thickness based on silicone resins including black pigments, this coated plate being of the same type as those sold under the reference KeraResin by Eurokera, this plate having a smooth upper face and a smooth lower face (this face likewise possibly being provided with studs), and a thickness of 4 mm, the coated substrate having a haze of 66.7%, a light transmission $T_L$ of 0.03% and an opacity indicator of 99.96. This substrate is for example obtained by decreasing, in the process for manufacturing glass-ceramics of the KeraResin type, the run speed through the ceramitization furnace by 50%.

The glass-ceramic substrate obtained has a flatness of less than 2 mm (the flatness obtained being between 2 and 3 mm for a speed decreased by only 25%, and being more than 15 mm for a speed that is unchanged relative to that used in the aforementioned application to obtain a plate of standard size smaller than 0.4 m²), the flatness required to obtain good optical properties and good coupling and thermal efficiency properties in particular being lower than 3 mm and preferably lower than 2 mm.

The item of furniture and/or appliance furthermore comprises in the present example three heating elements (7), inductors for example, placed under the plate (6). These inductors are in the present case arranged in the middle of the worktop, but they could equally well be located at one end of the worktop.

The item of furniture and/or appliance also comprises three light sources (8) intended to signal the cooking locations and placed above the substrate (plumb above the worktop). These sources allow the cooking locations to be signaled, for example by way of a disk or a circle of colored light (9) delimiting each location (the colors possibly if needs be being identical or different for each location) and encircling the inductors, when these sources are activated, or even when the heating elements are activated if the sources are connected to said elements via an appropriate interface. The sources (8) are for example formed by a plurality of LEDs borne by a base housed in a profile, and for example integrated into an extractor hood (14) located plumb above the worktop. These sources, apart from signaling heating zones, may also or alternatively serve to illuminate (locally or entirely) the worktop, or to display by projection various items of information, such as data to be displayed, culinary recipes (11), etc.

Figure 3:
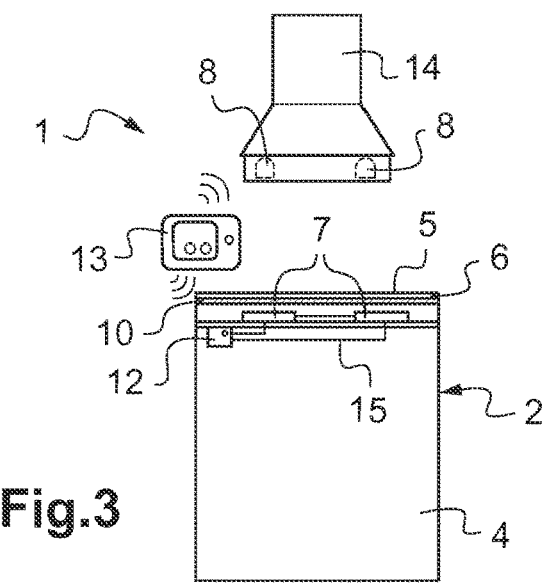
FIG. 3 shows a schematic side view in which a side panel of the unit (23) has been removed in order to allow certain components of the item of furniture and/or appliance to be seen.

The item of furniture and/or appliance furthermore comprises at least one interface (12) (hidden by the substrate) for communicating with the heating elements, and, if needs be, with the light sources, this interface also communicating wirelessly with an external system for example taking the form of a touch-sensitive tablet (13) for controlling the activation of various zones or functions of the plate or item of furniture and/or appliance. The external system may advantageously be movable and be kept on the worktop (FIG. 1) or be used to remotely activate (FIG. 3) various zones or functions. Alternatively or cumulatively, the interface could also comprise or be connected to an integrated control panel, located on the surface of the substrate (2), for controlling the activation of various zones and functions, in particular of the substrate.

The item of furniture and/or appliance also comprises other elements, especially electrical cables (15) for the activation of the heating elements and for the activation of the sources, and comprises drawers (15) or cupboards (17) arranged in the carcass supporting the worktop, for storing various articles, etc. The item of furniture and/or appliance may also comprise other elements, for example the worktop may comprise a trim and the substrate may be coated with an optionally localized permanent decoration, an enamel decoration for example. The carcass may be unapertured or comprise various voids (such as the void (18)), or incorporate other elements (for example a built-in oven, etc.). The worktop (5) may be used for various purposes, such as for writing (as symbolized by the paper and pen (19)), to hold objects (as symbolized by the tableware (20)) while also allowing food to be cooked (as symbolized by the cooking recipients (21)), etc. If needs be, the carcass may also be replaced by supporting legs (for example only the panels 22 and 23, or four legs at the four corners, components located under the worktop in this case preferably being hidden by a localized housing of a few centimeters thickness, under the substrate) like those of a table.

The item of furniture and/or appliance according to the invention may especially and advantageously be used to create a new range of interactive and multiuse units especially integrating cooking zones or a cooking function.

The invention claimed is:

1. An item of furniture or appliance, comprising:
    at least one monolithic worktop formed from only one substrate made of a transparent monolithic glazing material providing a continuous, uniform and joint-free surface and of area larger than 0.7 m², equipped with a coating so that the substrate equipped with the coating has a haze higher than 40%, a light transmission $T_L$ lower than 30% and an opacity indicator higher than 90;
    at least one heating element;
    at least one light source; and
    at least one interface for communicating with at least one element of the worktop,
    wherein said worktop has at least one cooking location plumb with the at least one heating element and wherein the transparent monolithic glazing material has a light transmission $T_L$ higher than 60%.

2. The item of furniture or appliance as claimed in claim 1, wherein the area of the substrate is larger than 0.9m² and a thickness of said substrate is at least 2 mm and smaller than 15 mm.

3. The item of furniture or appliance as claimed in claim 1, wherein the substrate has a flatness lower than 0.1% of a diagonal of the substrate.

4. The item of furniture or appliance as claimed in claim 1, wherein the substrate is made of tempered glass or glass-ceramic.

5. The item of furniture or appliance as claimed in claim 1, wherein the transparent monolithic glazing material contains colorants.

6. The item of furniture or appliance as claimed in claim 1, wherein the at least one heating element includes one or more inductive heating means.

7. The item of furniture or appliance as claimed in claim 1, wherein said at least one cooking location is signaled, on activation or permanently, by said at least one light source.

8. The item of furniture or appliance as claimed in claim 7, wherein said at least one light source is placed under the substrate and provides a luminous display via the transmission of light through the worktop.

9. The item of furniture or appliance as claimed in claim 7, wherein the coated substrate has a light transmission $T_L$ of at least 5%.

10. The item of furniture or appliance as claimed in claim 1, wherein the at least one light source is activatable via at least one of contact with a surface of the worktop, with the interface, with an external system, and via a movement.

11. The item of furniture or appliance as claimed in claim 1, wherein the item of furniture or appliance comprises a plurality of light sources that are placed so that the angle between each source, or between each element transmitting the light to the worktop, and the normal to the worktop is between 5 and 60° in order to minimize effects of shadows projected by a person using the worktop.

12. The item of furniture or appliance as claimed in claim 1, wherein the interface enables wireless communication with a system external to the worktop to allow heating zones or light sources to be activated or various functions to be controlled remotely, the external system including a keyboard, a tablet, a touch screen, or a cellphone, and the wireless communication being of limited range.

13. The item of furniture or appliance as claimed in claim 1, wherein the interface allows various signals initiated via contact or a movement to be transmitted in order to activate various components or allow data to be downloaded or transmitted, the data being transmitted to light sources to be displayed on a surface of the worktop.

14. The item of furniture or appliance as claimed in claim 12, wherein the item of furniture or appliance comprises one or more interfaces allowing the activation of the heating zones to be coordinated with the activation of the light sources.

15. The item of furniture or appliance as claimed in claim 1, wherein the worktop comprises one or more functional or decorative coatings based on enamel, paint, or one or more thin films.

16. The item of furniture or appliance as claimed in claim 1, wherein the worktop is mounted on one or more supporting elements to form, with said supporting elements, a table, an unapertured unit, or a counter.

17. The item of furniture or appliance as claimed in claim 1, wherein the at least one interface is configured to communicate wirelessly with at least one external element.

* * * * *